(Model.)
J. P. MORRIS.
DENTAL TOOL.
No. 384,863.     Patented June 19, 1888.
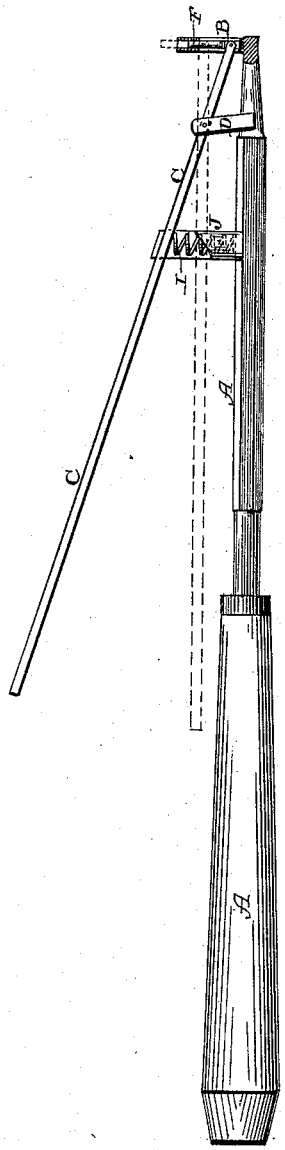
Witnesses.
R. F. Gardiner
Edm. P. Ellis
Inventor.
J. P. Morris,
per J. A. Lehmann,
atty.

UNITED STATES PATENT OFFICE.

JAMES P. MORRIS, OF PARIS, TEXAS.

DENTAL TOOL.

SPECIFICATION forming part of Letters Patent No. 384,863, dated June 19, 1888.

Application filed December 6, 1887. Serial No. 257,109. (Model.)

*To all whom it may concern:*

Be it known that I, JAMES P. MORRIS, of Paris, in the county of Lamar and State of Texas, have invented certain new and useful Improvements in Dental Instruments; and I do hereby declare the following to be a full, clear, and exact description of the invention, such as will enable others skilled in the art to which it pertains to make and use it, reference being had to the accompanying drawings, which form part of this specification.

My invention relates to an improved dental instrument; and it consists in the combination of a suitable handle having a cup to receive the amalgam formed upon one end and extending at an angle to the handle, and a pivoted lever for forcing the amalgam from the cup into a cavity in the tooth, as will be more fully described hereinafter.

The object of my invention is to provide an amalgam-carrier by means of which the amalgam can be carried direct to the tooth and forced onto the cavity therein, and thus prevent the loss of amalgam, which always takes place when the amalgam is conveyed to the cavity in the tooth by means of forceps or other similar devices.

The accompanying drawing represents a side elevation of the tool embodying my invention, partly in section, the lever being shown in one position in solid lines and in another position in dotted lines.

A represents a suitable handle, of any desired length or construction, and which has the cup B formed upon one end and extending at an angle to the handle. In the outer end of this cup the amalgam, which is to be inserted in a cavity in one of the teeth, is placed, and this cup is turned at an angle to the handle, so that the amalgam can be conveniently carried to any tooth in the head and forced into any cavity which is made in any part of the tooth. Through the inner side of the inner end of the cup is formed a suitable slot, through which the end of the operating-lever C passes. This lever is pivoted upon a suitable support, D, secured to the handle, and has the plunger F, which moves back and forth in the cup, loosely pivoted to its shorter end. This plunger forms both the bottom of the cup and at the same time a means for forcing the amalgam from the cup into the cavity in the tooth and slightly compressing it therein. After the amalgam has been conveyed to the cavity in the tooth a pressure is exerted upon the outer end of the lever, which causes the plunger to force the amalgam from the cup into the cavity and at the same time to slightly compress the amalgam in position. The cup is filled again and again with amalgam until a sufficient quantity has been inserted in the tooth, when the amalgam will be compressed by the dentist in the usual manner.

In order to cause the operating-lever to move perfectly straight, and at the same time to place the spring I under it, a guide, J, is attached to the handle, and which is slotted upon opposite sides, so that the lever can play freely up and down through the slots. The spring bears against the shank at one end and against the under side of the lever at the other, and instantly returns the handle to position as soon as the handle is left free to move. As soon as the amalgam has been forced into position by the plunger the operator has but to relieve the outer end of the lever from the pressure of the thumb when the lever instantly returns to position and draws the plunger into the cup.

Where the dentist has to insert the filling into the cavity in the tooth by either fingers or forceps, a large proportion of the amalgam is dropped into the mouth and thus lost, causing inconvenience to the person whose tooth is being filled and a loss to the dentist.

By means of a tool constructed as here shown no loss of the amalgam need ever take place, for it can be conveyed directly to the cavity and forced therein, no matter in what part of the tooth it may be.

Having thus described my invention, I claim—

1. The combination of a suitable handle having a cup to receive the amalgam connected thereto, an operating-lever, and a plunger for forcing the amalgam from the cup into the cavity in the tooth, substantially as shown.

2. The combination of the handle having a cup formed upon one end to receive the amalgam, the pivoted lever, the plunger placed inside of the cup, and the spring for operating the lever, substantially as described.

In testimony whereof I affix my signature in presence of two witnesses.

JAMES P. MORRIS.

Witnesses:
W. T. McFADDEN,
B. B. STURGEON.